United States Patent [19]

Püntener et al.

[11] Patent Number: 5,023,274

[45] Date of Patent: Jun. 11, 1991

[54] FIBRE-REACTIVE FORMAZAN DYES CONTAINING β-HALOGENETHYL OR VINYLSULFONYL-ALKANOYLAMINO FIBER-REACTIVE GROUPS

[75] Inventors: Alois Püntener, Rheinfelden; Urs Lehmann, Basel; Peter Scheibli, Bottmingen; Josef Koller, Reinach, all of Switzerland

[73] Assignee: Ciba-Geigy Corporation, Ardsley, N.Y.

[21] Appl. No.: 342,925

[22] Filed: Apr. 25, 1989

[30] Foreign Application Priority Data

May 5, 1988 [CH] Switzerland ............... 1688/88

[51] Int. Cl.$^5$ .............. C09B 62/503; C09B 50/00; D06P 1/384; D06P 3/10
[52] U.S. Cl. .............. 534/618; 534/591; 534/641; 534/643; 534/652; 534/887
[58] Field of Search ............... 534/618, 652, 641, 643

[56] References Cited

U.S. PATENT DOCUMENTS

| | | | |
|---|---|---|---|
| 3,068,219 | 12/1962 | Beffa et al. | 534/618 |
| 3,718,641 | 2/1973 | Muller et al. | 534/641 |
| 4,024,123 | 5/1977 | Dussy et al. | 534/618 |
| 4,709,018 | 11/1987 | Seitz | 534/618 |
| 4,766,206 | 8/1988 | Tzikas | 534/618 X |
| 4,801,694 | 1/1989 | Scheibli et al. | 534/637 |
| 4,841,028 | 6/1989 | Aeschlimann et al. | 534/618 X |

FOREIGN PATENT DOCUMENTS

| | | | |
|---|---|---|---|
| 114032 | 7/1984 | European Pat. Off. | 534/643 |
| 210951 | 2/1987 | European Pat. Off. | 534/618 |
| 3239364 | 4/1984 | Fed. Rep. of Germany | 534/618 |
| 894788 | 4/1962 | United Kingdom | 534/643 |
| 1155149 | 6/1969 | United Kingdom | 534/643 |

OTHER PUBLICATIONS

K. Venkataraman, The Chemistry of Synthetic Dyes, vol. VI, pp. 287–297, Academic Press, (1972).
Ullman's Encyklopädie der Technischen Chemie, vol. 11, pp. 714–718, Verlag Chemie (1976).

*Primary Examiner*—David B. Springer
*Assistant Examiner*—Fiona T. Powers
*Attorney, Agent, or Firm*—George R. Dohmann; Edward McC. Roberts

[57] ABSTRACT

The fibre-reactive formazan dyes of the formula

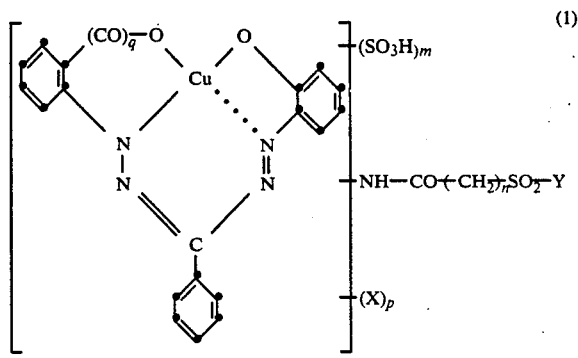

where X is $C_1-C_4$ alkyl, $C_1-C_4$ alkoxy, halogen, cyano or nitro, Y is β-haloethyl or vinyl, m is 1, 2 or 3, n is 3 or 4, p is 0, 1 or 2 and q is 0 or 1, produce dyeings having good fastness properties on nitrogen-containing or hydroxyl-containing fibre materials.

6 Claims, No Drawings

FIBRE-REACTIVE FORMAZAN DYES CONTAINING β-HALOGENETHYL OR VINYLSULFONYL-ALKANOYLAMINO FIBER-REACTIVE GROUPS

The present invention relates to novel fibre-reactive formazan dyes, to processes for preparing same and to the use of these dyes for dyeing and printing fibre materials.

The present invention accordingly provides fibre-reactive formazan dyes of the formula

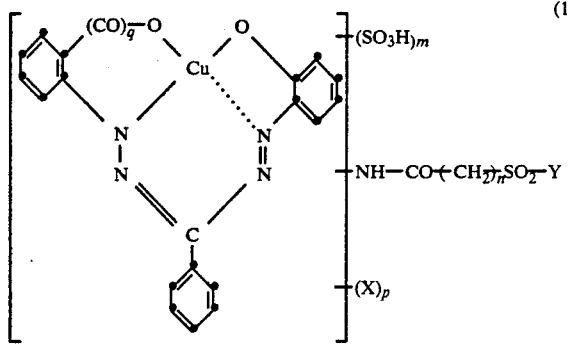

where X is $C_1$–$C_4$alkyl, $C_1$–$C_4$alkoxy, halogen, cyano or nitro, Y is β-haloethyl or venyl, m is 1, 2 or 3, n is 3 or 4, p is 0, 1 or 2 and q is 0 or 1, and mixtures of these dyes.

A halogen X in the formula (1) is for example fluorine, bromine or preferably chlorine.

A β-haloethyl Y in the formula (1) is preferably β-bromoethyl or in particular β-chloroethyl. Preference is given to dyes of the formula (1) where q is 1.

A $C_1$–$C_4$alkyl X in the formula (1) is for example methyl, ethyl, propyl, isopropyl, butyl, tert-butyl, sec-butyl or isobutyl, in particular methyl.

A $C_1$–$C_4$alkoxy X in the formula (1) is for example methoxy, ethoxy, propoxy, isopropoxy, butoxy, sec-butoxy, tert-butoxy or isobutoxy, in particular methoxy or ethoxy.

Preference is given to dyes of the formula (1) where m is 2.

Preference is likewise given to dyes of the formula (1) where X is chlorine, especially to dyes of the formula (1) where m is 2, q is 1 and X is chlorine.

Preference is further given to dyes of the formula (1) where n is 3, especially to dyes of the formula (1) where n is 3, m is 2, q is 1 and X is chlorine.

Particular preference is given to dyes of the formula

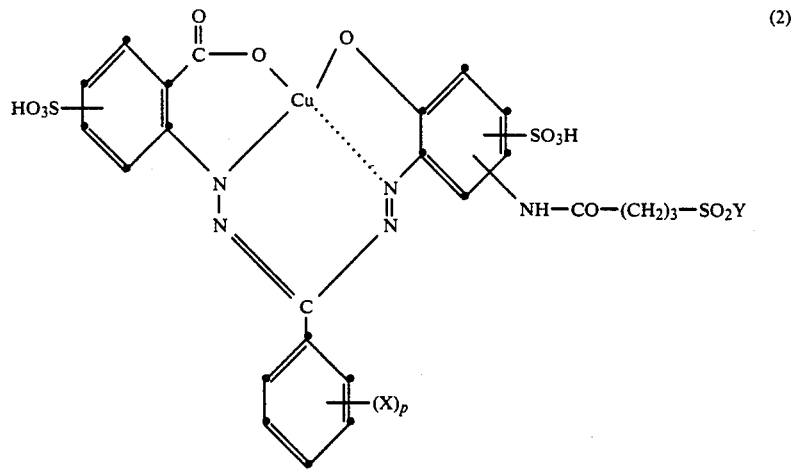

where X is chlorine and Y and p are as defined under the formula (1).

Particular preference is likewise given to dyes of the formula

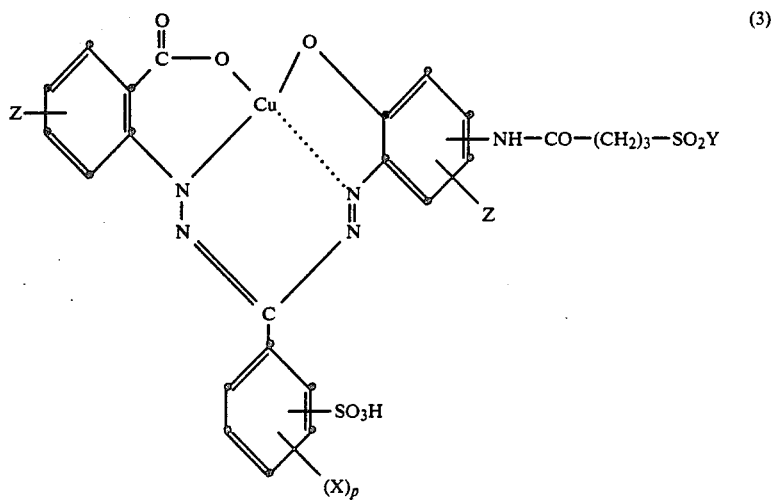
where X is chlorine and Y and p are as defined under the formula (1), one Z is hydrogen and the other Z is sulfo.
Very particular preference is given to the dyes of the formulae
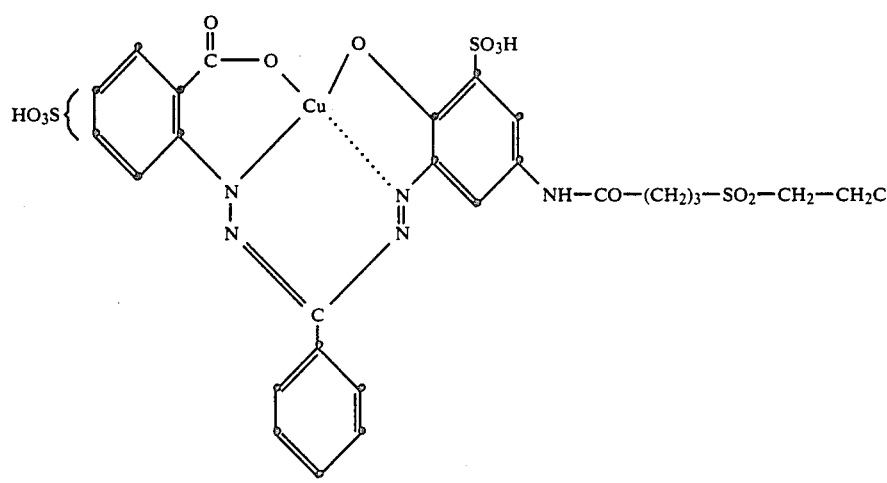
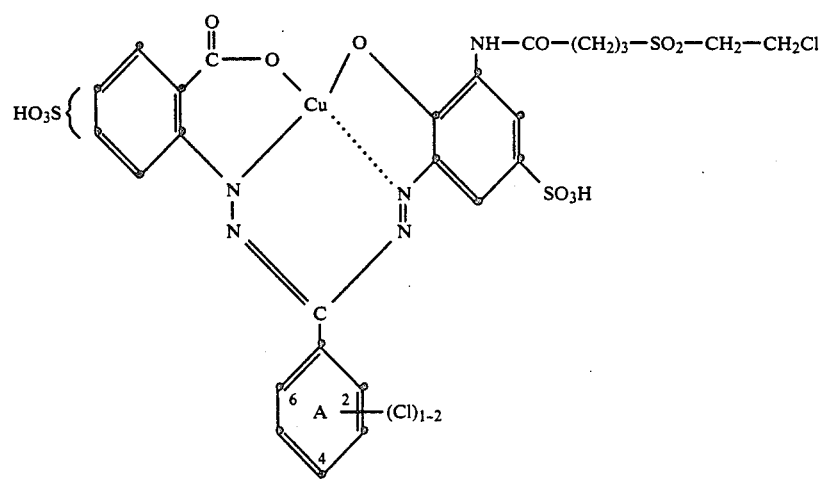
where chlorine is bonded to the phenyl ring A is the 2-, 3- or 4-position, or where chlorine is bonded to the phenyl ring A in the 2- and 6-positions;

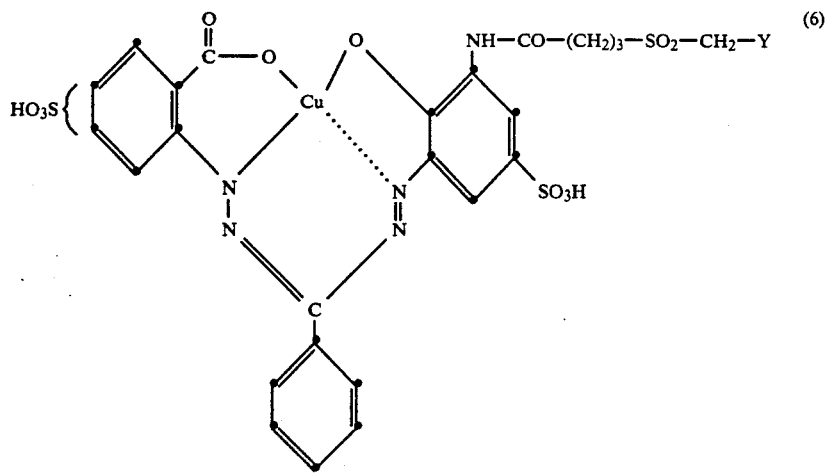

where Y is β-chloroethyl or vinyl, and

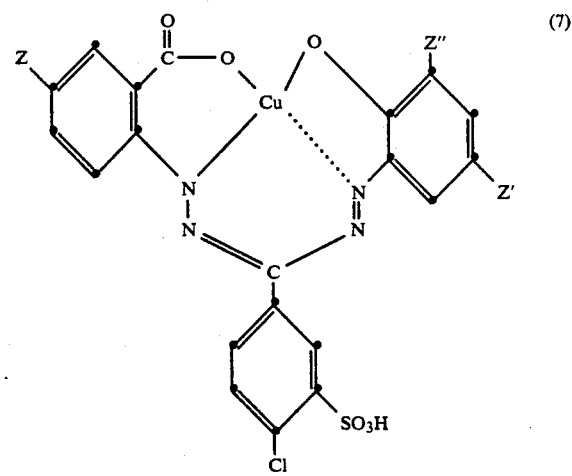

where Z is hydrogen, Z' is sulfo and Z" is —NH—CO—(CH₂)₃—SO₂—(CH₂)₂Cl, or where Z is sulfo, Z' is —NH—CO—(CH₂)₃—SO₂—(CH₂)₂Cl and Z" is hydrogen.

Of the fibre-reactive formazan dyes of the formulae (1), (2) and (5), the dye of the formula

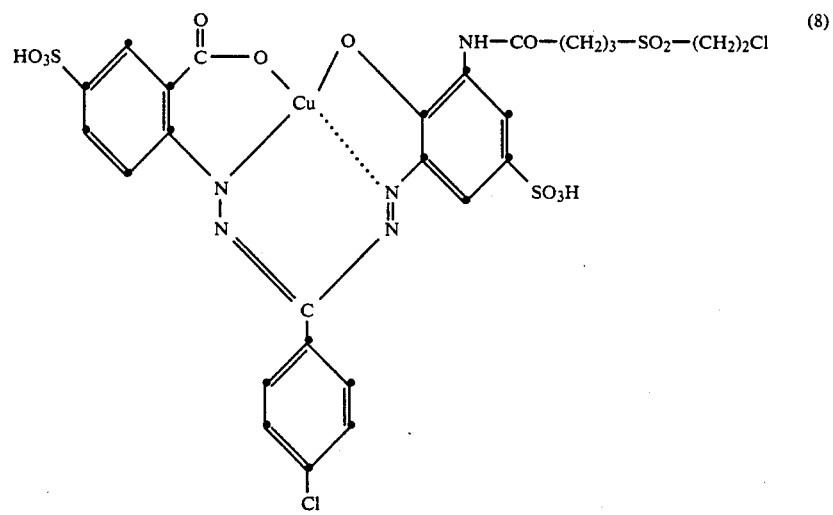

is particularly important.

The present invention further provides a process for preparing the dyes of the formula (1), which comprises reacting a compound of the formula

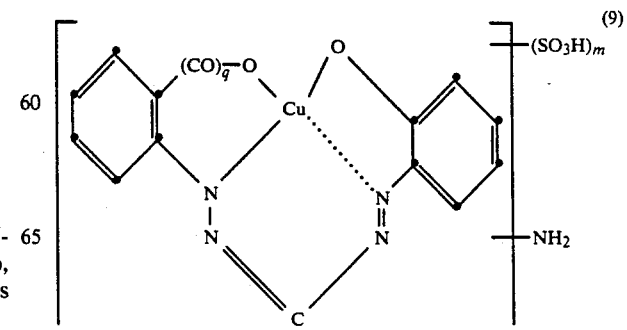

-continued

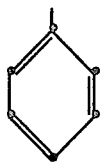 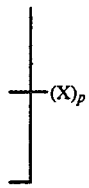

where X, m, p and q are as defined under the formula (1), with a compound that introduces the radical of the formula

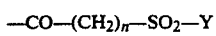

—CO—(CH₂)ₙ—SO₂—Y    (10)

where n and Y are as defined under the formula (1) and subsequently if desired converting the radical —SO₂—Y from β-haloethylsulfonyl into vinylsulfonyl.

The compounds that introduce the radical of the formula (10) are preferably acid halides, in particular acid chlorides. Specific examples are: Cl—CO—(CH₂)₃—SO₂—(CH₂)₂Cl, Cl—CO—(CH₂)₄—SO₂—(CH₂)₂Cl, Cl—CO—(CH₂)₃—SO₂—CH=CH₂, Cl—CO—(CH₂)₄—SO₂—CH=CH₂.

A further embodiment of the process according to the invention comprises reacting an amine of the formula (9) with a compound that introduces the radical of the formula —CO—(CH₂)ₙ—SO₂—(CH₂)₂—B, where n is as defined under the formula (1) and B is an inorganic or organic radical that is detachable under alkaline conditions, e.g. —OSO₃H, —SSO₃H, —OPO₃H₂, —S—CS—N(C₂H₅)₂, —N(CH₃)₂, —N(C₂H₅)₂, —OCOCH₃.

The preparation of these dyes, containing the radical B, is then followed by an elimination reaction. For example, the dye which contains the radical B can be treated under alkaline conditions, for example sodium hydroxide, to eliminate the radical HB and convert the radical of the formula —CO—(CH₂)ₙ—SO₂—(CH₂)₂—B into the radical —CO—(CH₂)ₙ—SO₂—CH=CH₂.

The same alkaline conditions bring about the above-mentioned conversion of the β-chloroethylsulfonyl radical into a vinylsulfonyl group.

The amine of the formula (9) is preferably condensed with the compound that introduces the radical of the formula (10) in aqueous solution, emulsion or suspension, at low temperature, for example 0° to 40° C., and at weakly acid, neutral or weakly alkaline pH. Advantageously, the hydrogen halide liberated in the course of the condensation is continuously neutralized by the addition of aqueous alkali metal hydroxides, carbonates or bicarbonates. A preferred embodiment of the process according to the invention comprises using an amine of the formula (9) where m is 2.

A similarly preferred embodiment of the process according to the invention comprises using an amine of the formula (9) where X is chlorine, in particular an amine of the formula (9) where X is chlorine, m is 2 and q is 1 together with a compound that introduces the radical of the formula (10).

A further preferred embodiment of the process according to the invention comprises using a compound that introduces the radical of the formula (10) where n is 3, use being made in particular of an amine of the formula (9) where X is chlorine, q is 1 and m is 2 together with a compound that introduces the radical of the formula (10) where n is 3.

A particularly preferred embodiment of the novel process for preparing the dyes of the formula (2) comprises condensing an amine of the formula

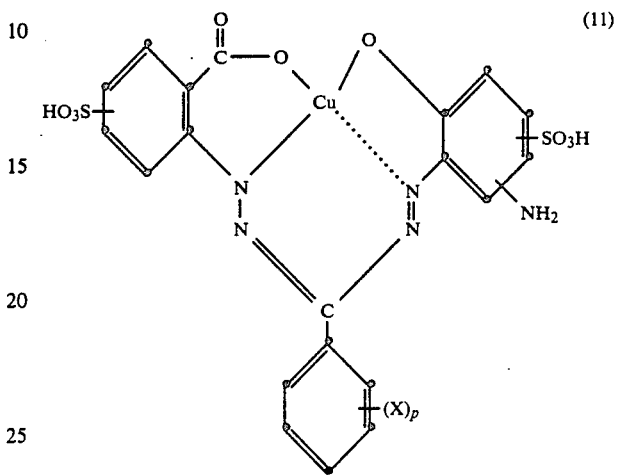

where X and p are as defined under the formula (2) with a compound that introduces the radical of the formula

—CO—(CH₂)₃—SO₂—Y    (12)

where Y is as defined under the formula (2).

A likewise particularly preferred embodiment of the novel process for preparing the dyes of the formula (3) comprises condensing an amine of the formula

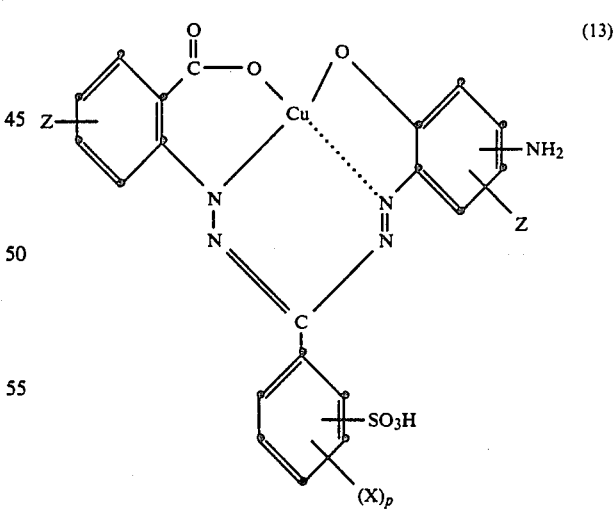

where X, Z and p are as defined under the formula (3) with a compound that introduces the radical of the formula (12).

A very particularly preferred embodiment of the novel process for preparing dyes of the formula (4) comprises condensing an amine of the formula

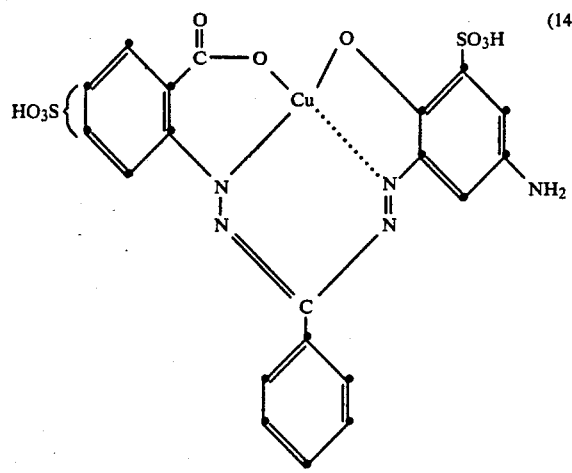

with a compound of the formula

Cl—CO—(CH$_2$)$_3$—SO$_2$—(CH$_2$)$_2$Cl      (15)

A likewise very particularly preferred embodiment of the novel process for preparing the dye of the formula (5) comprises condensing an amine of the formula

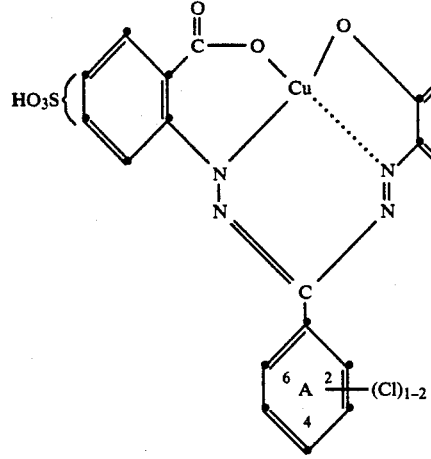

where (Cl)$_{1-2}$ and A are as defined under the formula (5) with a compound of the formula (15).

A further very particularly preferred embodiment of the novel process for preparing the dyes of the formula (6) comprises condensing an amine of the formula

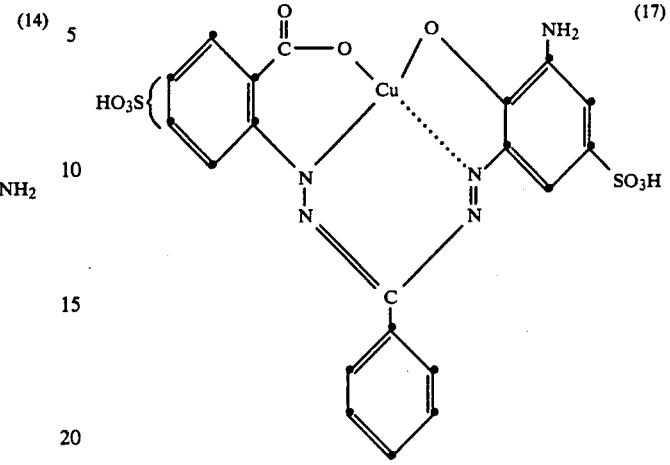

with a compound of the formula (15) and subsequently, if desired, converting the β-chloroethylsulfonyl group into a vinylsulfonyl group.

The very particularly preferred dyes of the formula (7) are prepared by condensing an amine of the formula

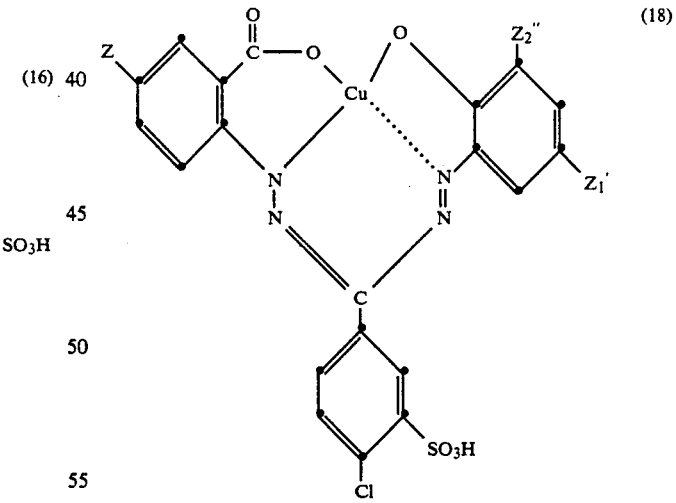

where Z is hydrogen, Z'$_1$ is sulfo and Z'$_2$ is —NH$_2$ or where Z is sulfo, Z'$_1$ is —NH$_2$ and Z'$_2$ is hydrogen with a compound of the formula (15).

A very particularly important embodiment of the novel process for preparing the dye of the formula (8) comprises condensing an amine of the formula

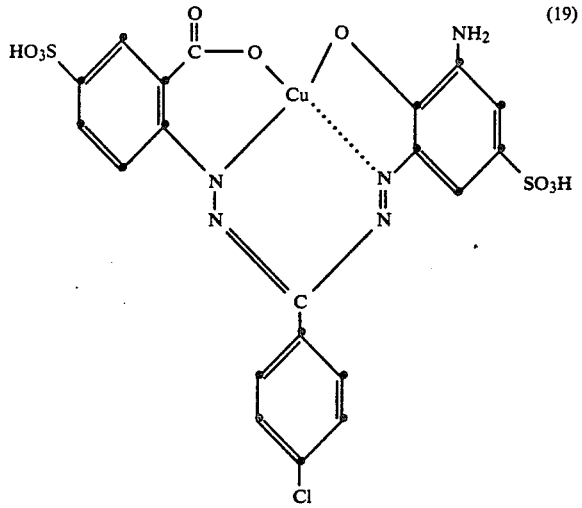

(19)

with the compound of the formula (15). The compounds of the formula (9) are known per se or can be prepared similarly to known compounds. Concerning the preparation of the copper complexes of tetradentate formazans, reference is made to K. Venkataraman, The Chemistry of Synthetic Dyes, Volume VI, pages 287 to 297, Academic Press New York and London (1972) and Ullmanns Encyklopädie der technischen Chemie, Volume 11, pages 714 to 718, Verlag Chemie (1976).

The compounds that introduce the radical of the formula (10) are likewise known per se or can be prepared similarly to known compounds; cf. DE-B-1,644,087.

The dyes of the formula (1) are suitable for dyeing and printing a very wide range of fibre materials, in particular textile fibre materials, for example silk, fibre materials made of cellulose and in particular wool, synthetic polyamide fibre materials, e.g. nylon-6 and nylon-6.6, and leather. The dyes of the formula (1) give level dyeings in blue shades having good all-round fastness properties, in particular good wet fastness, for example wet rub fastness, and good light fastness. Furthermore, the dyes of the formula (1) are highly compatible with other reactive dyes. The abovementioned textile material can be present in a very wide range of processing states, for example as yarn, woven fabric or knitted fabric.

It is to be noted that the dyes of the formula (1) according to the invention possess high reduction stability, good build-up properties, good rate of fixation and high levelness in the fibre and do not show any dichroism.

The dyes of the formula (1) according to the invention, which contain at least one sulfonic acid group, are present either in the form of their free acid or preferably as salts thereof. Suitable salts are for example alkali metal, alkaline earth metal or ammonium salts or the salts of an organic amine. Specific examples are the sodium, lithium, potassium or ammonium salts or the salt of triethanolamine.

It is further to be noted that the dyes of the formula (1) according to the invention are suitable for the trichromatic dyeing and printing of natural or synthetic polyamide fibre materials together with a fibre-reactive yellow- or orange-dyeing dye and a fibre-reactive red-dyeing dye.

Trichromatic here is to be understood as meaning the additive colour mixing of appropriately selected yellow- or orange-, red- and blue-dyeing dyes with which any desired shade of the visible colour spectrum can be matched by suitable choice of the mixing ratios.

The dyes to be used in the trichromatic process should give a uniform colour build-up at a constant shade in various concnetrations and show good compatibility.

The present invention thus also provides a process for the trichromatic dyeing or printing of natural and synthetic polyamide fibre materials with dyeing mixtures of fibre-reactive dyes, which comprises using a blue-dyeing dye of the formula (1) together with a yellow- or orange-dyeing sulfo-containing reactive dye and a red-dyeing sulfo-containing reactive dye.

More particularly, use is made of fibre-reactive sulfo-containing yellow- or orange- and red-dyeing azo dyes where the fibre-reactive group is preferably a halotriazine or halopyrimidine group or a group of the aliphatic series.

A preferred fibre-reactive halopyrimidine group or group of the aliphatic series is difluorochloropyrimidinyl, in particular 2,4-difluoro-5-chloropyrimidinyl, or α,β-dihalopropionyl, in particular α,β-dibromopropionyl, or α-haloacryloyl, in particular α-bromoacryloyl.

Suitable yellow- or orange-dyeing sulfo-containing fibre-reactive dyes are for example the following:

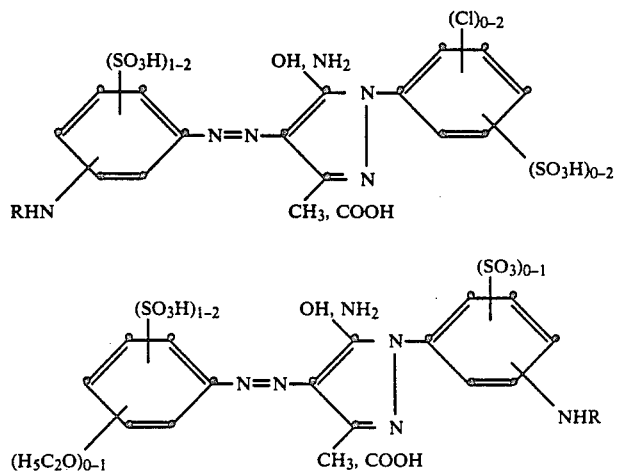

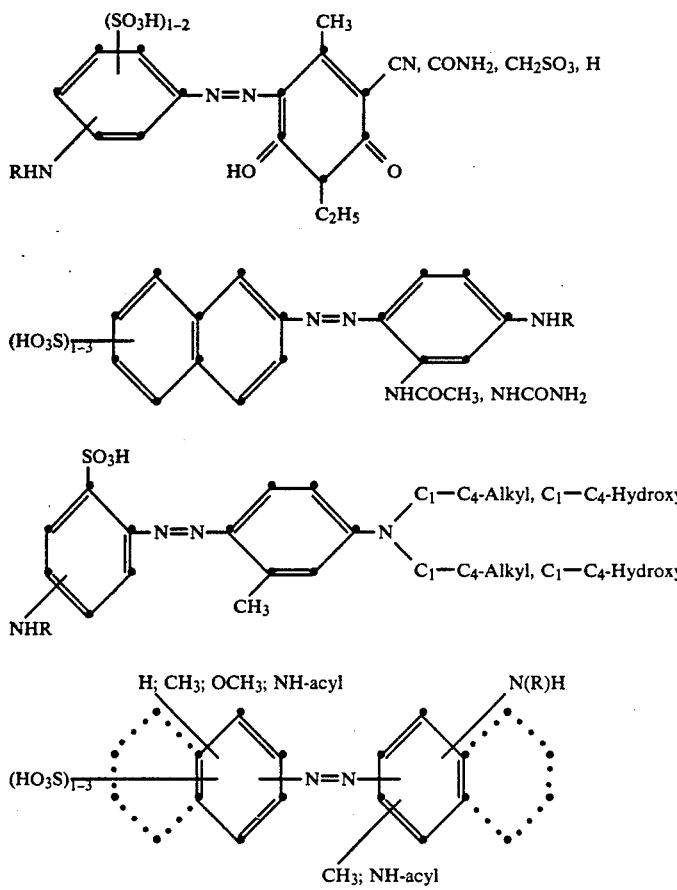
Suitable red-dyeing sulfo-containing fibre-reactive dyes are for example the following:
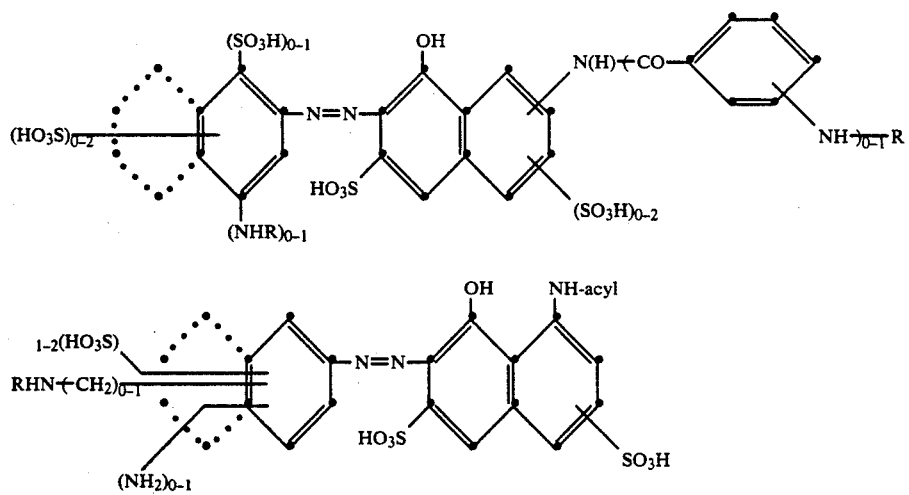
where acyl is for example acetyl or substituted or unsubstituted benzoyl.
The fused rings indicated by dots are alternatively possible naphthalene systems.

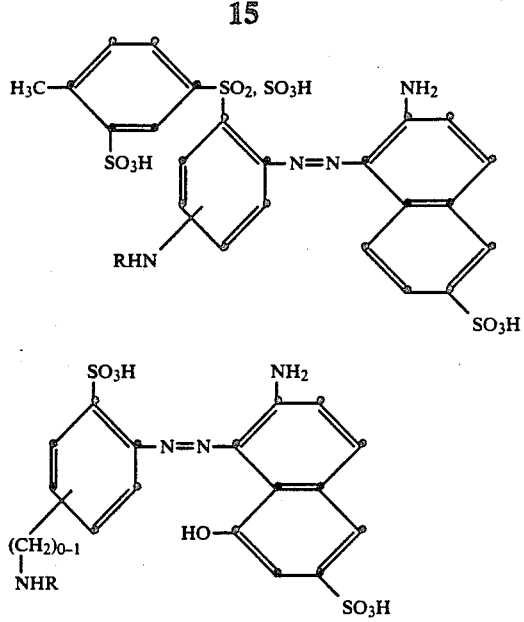
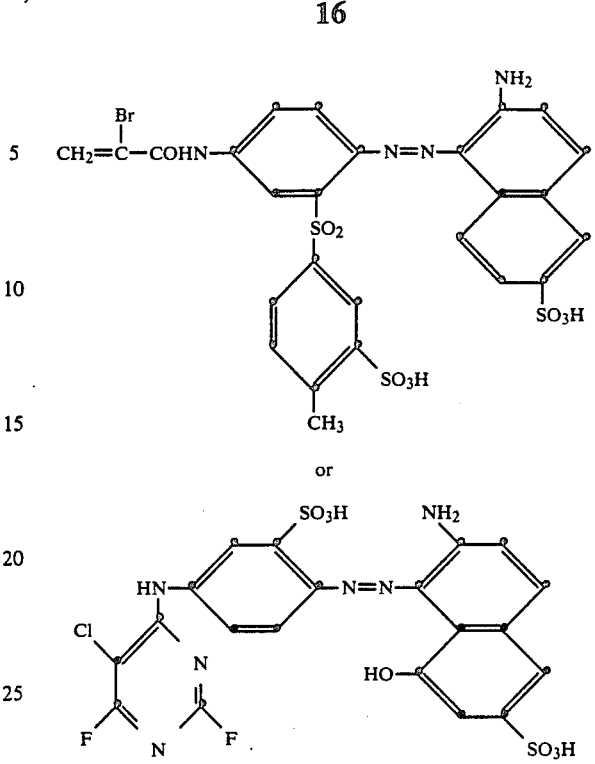

In the foregoing formulae, R is a fibre-reactive radical, in particular a fibre-reactive radical of the halotriazine or halopyrimidine series or of the aliphatic series, preferably R is difluorochloropyrimidinyl or α,β-dihalopropionyl or α-bromoacryloyl. R is particularly preferably 2,4-difluoro-5-chloropyrimidin-6-yl or α,β-dibromopropionly or α-bromoacryloyl.

In the novel process for the trichromatic dyeing or printing of natural and synthetic polyamide fibre materials, the blue-dyeing dyes used are those mentioned above, in particular those of the formulae (2) to (7), especially the dye of the formula (8).

Particularly preferred yellow- or orange-dyeing dyes are:

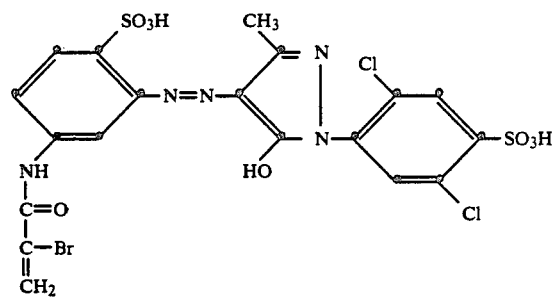

or

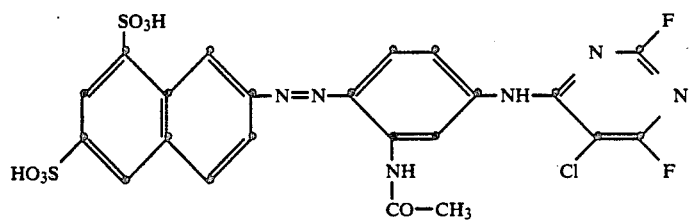

Particularly preferred red-dyeing dyes are:

The yellow- or orange- and red-dyeing dyes used in the novel process for trichromatic dyeing or printing are known or can be prepared similarly to known dyes. The dyes are present either in the form of their free sulfonic acid or preferably as the salt thereof, in which case it is possible to use the same salts as indicated for the dyes of the formula (1).

The amounts in which the dyes of the formula (1) and the yellow- or orange- and red-dyeing fibre-reactive dyes are used in the dyebaths or printing pastes can vary within wide limits, depending on the desired depth of shade, but in general amounts of 0.01 to 10 per cent by weight, in particular 2 to 10 per cent by weight, based on the material to be dyed or on the printing paste, has proved advantageous.

Preferably, the process according to the invention is applied to fibre material made of natural polyamides, in particular wool.

The process according to the invention does not require any special apparatus. It is possible to use the customary dyeing and printing apparatus and machines, for example for loose fibre, tops, hank yarn, yarn packages, piece goods and carpets.

As well as the reactive dye the aqueous dyebaths may contain further assistants, in particular levelling assistants. The levelling assistants are used in an amount of 0.3 to 3 per cent by weight on weight of fibre.

The dyebaths may contain as further assistants mineral acids, such as sulfuric acid, sulfamic acid or phosphoric acid, organic acids, advantageously lower, aliphatic carboxylic acids, such as formic acid, acetic acid or maleic acid. The acids are used in particular to adjust the pH of the liquors to be used according to the invention.

Preferably the adjustment to a pH of 3 to 6 is effected with an organic acid, in particular formic acid or acetic acid.

Preferably, dyeing is carried out at a pH of 4 to 6, in particular 4.2 to 5.5.

The dyeing liquor may further contain various salts, in particular ammonium salts or alkali metal salts, such as ammonium sulfate or sodium sulfate, as assistants.

The liquor ratio can be varied within a wide limit, from 6:1 to 80:1, preferably from 10:1 to 50:1.

Dyeing takes place from an aqueous liquor by the exhaust method, for example at a temperature between 80° and 105° C. 110° C., using a formaldehyde-eliminating wool-protecting agent, preferably between 98° and 103° C.

The dyeing time is in general 30 to 90 minutes.

In a particularly preferred embodiment of the process according to the invention, dyeing at preferably 98° to 103° C. is followed by cooling the dyeing liquor down to about 75° to 90° C. and adjustment of the pH to 8-9, preferably to about 8.5. The pH can be adjusted by means of customary reagents, for example alkali metal hydroxide solutions or in particular aqueous ammonia solution of customary concentration, containing for example 25 per cent by weight of ammonia.

In the Examples, parts are by weight. The temperatures are given in degrees celsius. Parts by weight bear the same relation to parts by volume as the gram to the cubic centimeter.

EXAMPLE 1

4.93 parts of the amine of the formula

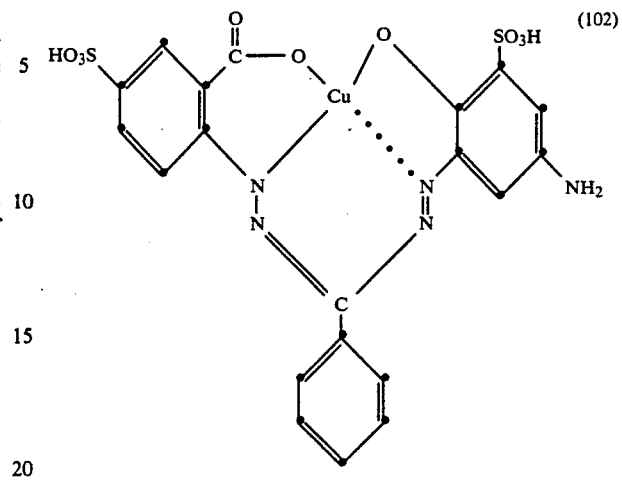

are added to 70 parts of water and stirred in thoroughly. The solution is then cooled down to 10°, and the pH is adjusted from about 8.2 to 6.5 with concentrated hydrochloric acid (32%). 1.4 parts of the compound of the formula $$Cl-CO-(CH_2)_3-SO_2-(CH_2)_2Cl \quad (103)$$

are then added dropwise at a temperature of 10° and a pH of 6.5 to 7 in the course of 10 minutes. The pH is maintained by adding aqueous sodium hydroxide solution (30%). The mixture is then stirred for 5 hours, and thereafter 10 parts of sodium chloride are added. The completely precipitated dye is filtered off and dried at 50° under reduced pressure. The dye formed, which conforms in the form of the free acid to the formula (101), dyes wool in blue shades having good wet fastness properties and good light fastness.

EXAMPLES 2-23

Example 1 is repeated, except that the 4.93 parts of the amine of the formula (102) are replaced by an equimolar amount of the amines indicated in column 2 of the table below, affording the dyes indicated in column 3 which dye wool in the hue indicated in column 4; in the Examples 12 to 23, the indefinitely positioned sulfo group is in the 3- or in the 4-position.

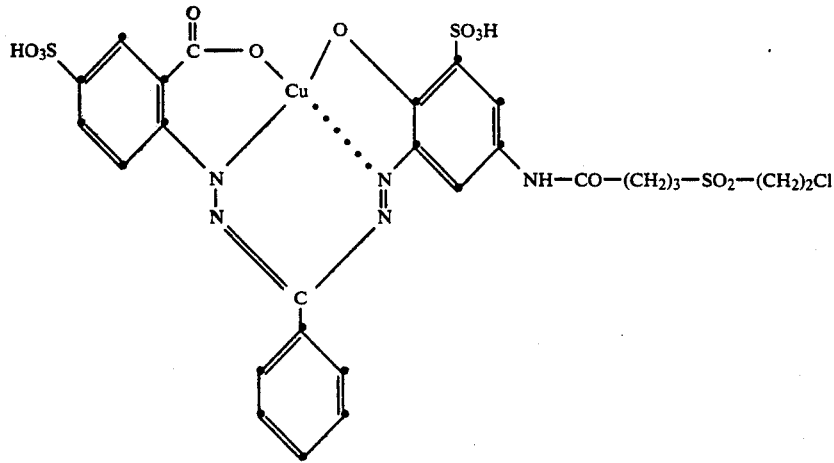

TABLE

| Example | Amine | Dye | Hue on wool |
|---|---|---|---|
| 2 | [Cu complex azo structure with SO₃H and NH₂ substituents] | [Cu complex azo structure with SO₃H and NH–CO–(CH₂)₃–SO₂–(CH₂)₂Cl substituents] (104) | greenish blue |
| 3 | [Cu complex azo structure with SO₃H and NH₂ substituents] | [Cu complex azo structure with SO₃H and NH–CO–(CH₂)₃–SO₂–(CH₂)₂Cl substituents] (105) | blue |

TABLE-continued
| Example | Amine | Dye | Hue on wool |
|---|---|---|---|
| 4 | 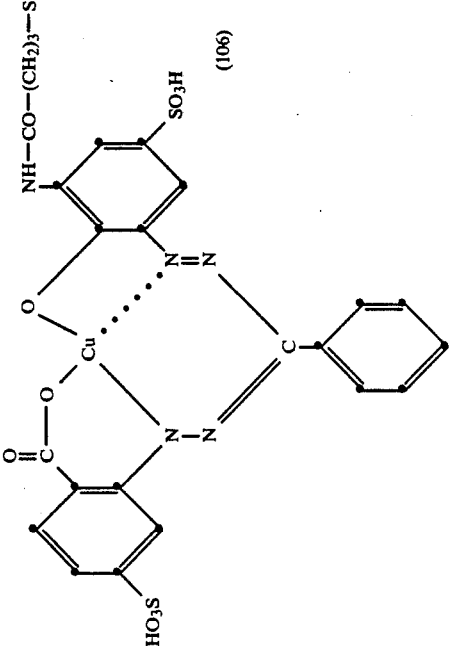 | 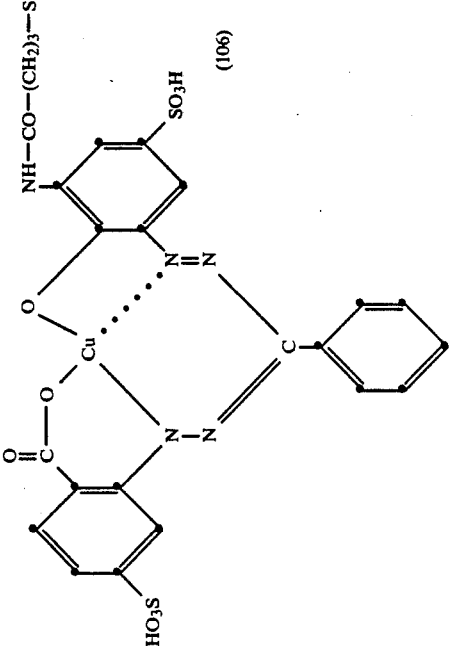 (106) | blue |
| 5 | 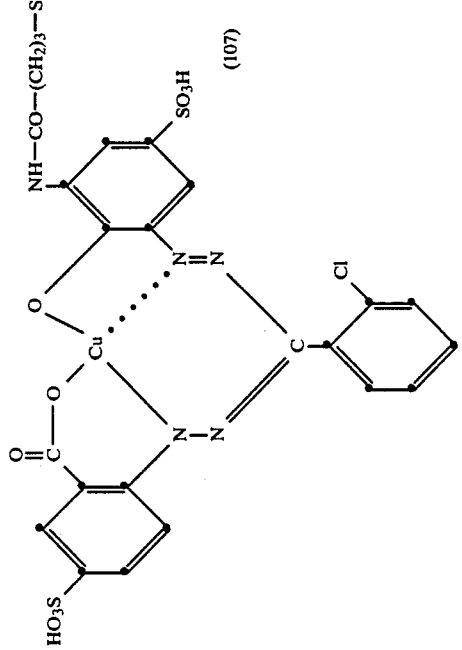 | 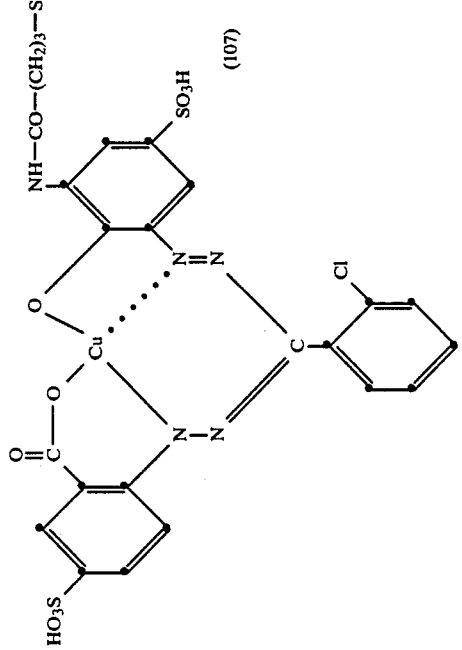 (107) | reddish blue |

TABLE-continued

| Example | Amine | Dye | Hue on wool |
|---|---|---|---|
| 6 | (structure with NH₂, SO₃H, Cu complex, azo, Cl-phenyl, HO₃S) | (108) (structure with NH—CO—(CH₂)₃—SO₂—(CH₂)₂Cl, SO₃H, Cu complex, azo, Cl-phenyl, HO₃S) | reddish blue |
| 7 | (structure with NH₂, SO₃H, Cu complex, azo, 4-Cl-phenyl, HO₃S) | (109) (structure with NH—CO—(CH₂)₃—SO₂—(CH₂)₂Cl, SO₃H, Cu complex, azo, 4-Cl-phenyl, HO₃S) | greenish blue |

| Example | Amine | Dye | Hue on wool |
|---|---|---|---|
| 8 | 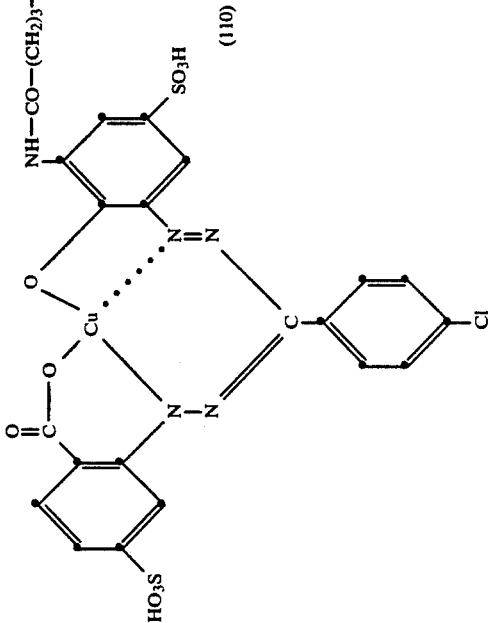 | 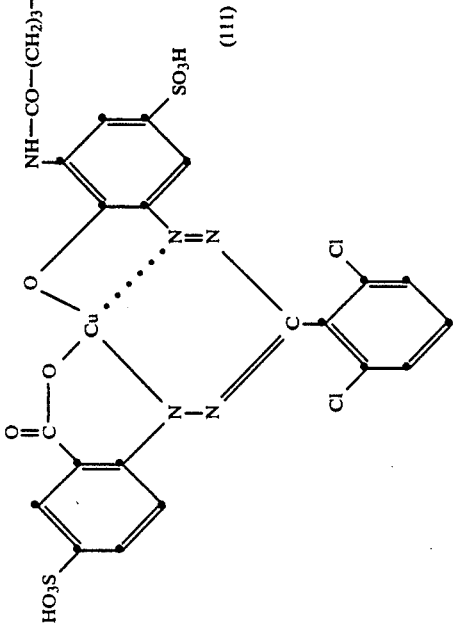 (110) | greenish blue |
| 9 | | (111) | reddish blue |

TABLE-continued

| Example | Amine | Dye | Hue on wool |
|---|---|---|---|
| 10 | (structure with NH₂, SO₃H, Cu complex, Cl) | (112) structure with NH—CO—(CH₂)₃—SO₂—(CH₂)₂Cl, SO₃H, Cu complex, Cl | greenish blue |
| 11 | (structure with NH₂, SO₃H, Cu complex, Cl, HO₃S) | (113) structure with NH—CO—(CH₂)₃—SO₂—(CH₂)₂Cl, SO₃H, Cu complex, Cl, HO₃S | greenish blue |

TABLE-continued

| Example | Amine | Dye | Hue on wool |
|---|---|---|---|
| 12 | [Cu complex structure with NH$_2$, SO$_3$H, HO$_3$S, N=N, NO$_2$ (meta) groups] | [Cu complex structure with NH—CO—(CH$_2$)$_3$—SO$_2$—(CH$_2$)$_2$Cl, SO$_3$H, HO$_3$S, N=N, NO$_2$ (meta) groups] (114) | blue |
| 13 | [Cu complex structure with NH$_2$, SO$_3$H, HO$_3$S, N=N, NO$_2$ (para) groups] | [Cu complex structure with NH—CO—(CH$_2$)$_3$—SO$_2$—(CH$_2$)$_2$Cl, SO$_3$H, HO$_3$S, N=N, NO$_2$ (para) groups] (115) | blue |

TABLE-continued

| Example | Amine | Dye | Hue on wool |
|---|---|---|---|
| 14 | [Cu complex structure with $NH_2$, $SO_3H$, azo groups, p-tolyl, and $HO_3S$-substituted phenyl with carboxylate] | [Cu complex structure (116) with $NH-CO-(CH_2)_3-SO_2-(CH_2)_2Cl$, $SO_3H$, azo groups, p-tolyl, and $HO_3S$-substituted phenyl with carboxylate] | blue |
| 15 | [Cu complex structure with $NH_2$, $SO_3H$, azo groups, o-tolyl ($CH_3$), and $HO_3S$-substituted phenyl with carboxylate] | [Cu complex structure (117) with $NH-CO-(CH_2)_3-SO_2-(CH_2)_2Cl$, $SO_3H$, azo groups, o-tolyl ($CH_3$), and $HO_3S$-substituted phenyl with carboxylate] | blue |

| Example | Amine | Dye | Hue on wool |
|---|---|---|---|
| 16 | (structure with NH₂, SO₃H, Cu complex, CH₃ phenyl) | (118) structure with NH—CO—(CH₂)₃—SO₂—(CH₂)₂Cl, SO₃H, Cu complex, CH₃ phenyl | blue |
| 17 | (structure with NH₂, SO₃H, Cu complex, CN phenyl) | (119) structure with NH—CO—(CH₂)₃—SO₂—(CH₂)₂Cl, SO₃H, Cu complex, CN phenyl | blue |

| Example | Amine | Dye | Hue on wool |
|---|---|---|---|
| 18 | [Cu complex structure with amine group NH₂, SO₃H, and phenyl-OCH₃ substituent] | [Cu complex structure with NH—CO—(CH₂)₃—SO₂—(CH₂)₂Cl, SO₃H, and phenyl-OCH₃ substituent] (120) | blue |
| 19 | [Cu complex structure with amine group NH₂, SO₃H, and phenyl-OCH₃ (ortho) substituent] | [Cu complex structure with NH—CO—(CH₂)₃—SO₂—(CH₂)₂Cl, SO₃H, and phenyl-OCH₃ (ortho) substituent] (120) | blue |

TABLE-continued

| Example | Amine | Dye | Hue on wool |
|---|---|---|---|
| 20 | [Cu complex structure with NH₂, SO₃H, HO₃S, OCH₃, OCH₃ substituents] | [Cu complex structure (122) with NH—CO—(CH₂)₃—SO₂—(CH₂)₂Cl, SO₃H, HO₃S, OCH₃, OCH₃ substituents] | blue |
| 21 | [Cu complex structure with NH₂, SO₃H, HO₃S, OC₂H₅ substituents] | [Cu complex structure (123) with NH—CO—(CH₂)₃—SO₂—(CH₂)₂Cl, SO₃H, HO₃S, OC₂H₅ substituents] | blue |

TABLE-continued

| Example | Amine | Dye | Hue on wool |
|---|---|---|---|
| 22 | [structure with NH₂, SO₃H, Cu complex, azo linkages, HO₃S, F] | (124) [structure with NH—CO—(CH₂)₃—SO₂—(CH₂)₂Cl, SO₃H, Cu complex, HO₃S, F] | blue |
| 23 | [structure with NH₂, SO₃H, Cu complex, azo linkages, HO₃S, NH₂] | (125) [structure with NH—CO—(CH₂)₃—SO₂—(CH₂)₂Cl, SO₃H, Cu complex, HO₃S] | greenish blue |

EXAMPLES 24 AND 25

Example 1 is repeated, except that the amine of the formula (102), is replaced by an equimolar amount of the amine of the formula (105) or of the amine of the formula (106) and the 1.4 parts of the compound of the formula (103) are replaced by an equimolar amount of the compound of the formula $$Cl-CO-(CH_2)_3-SO_2-CH=CH_2 \qquad (126)$$

which is added dropwise at room temperature at pH 10 in the course of about 30 minutes, affording the dye of the formula

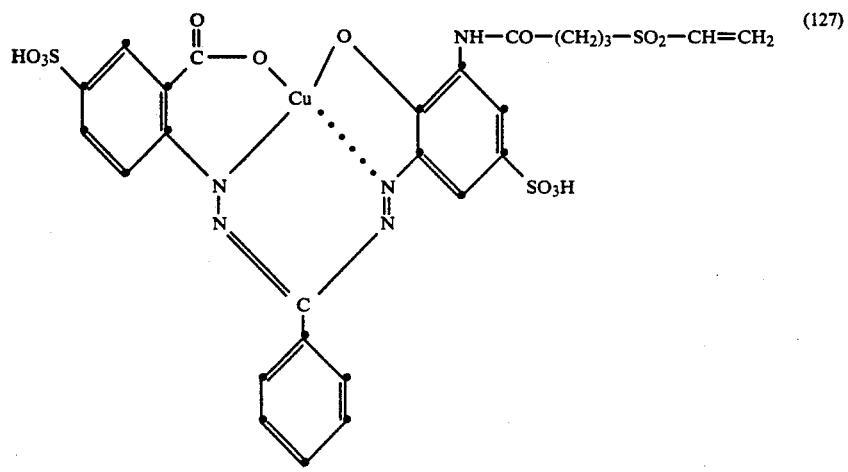
(127)

or the dye of the formula

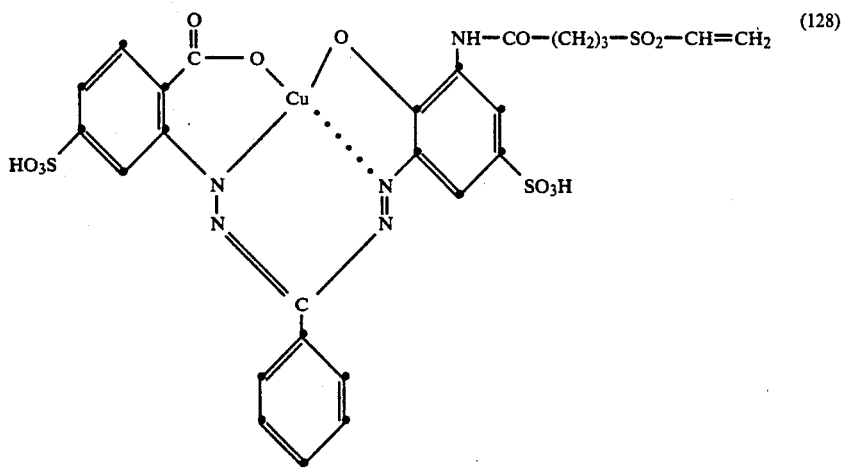
(128)

which dye wool in blue shades.

EXAMPLE 26

Example 1 is repeated, except that the 4.93 parts of the amine of the formula (102) are replaced by an equimolar amount of the amine of the formula affording the dye of the formula

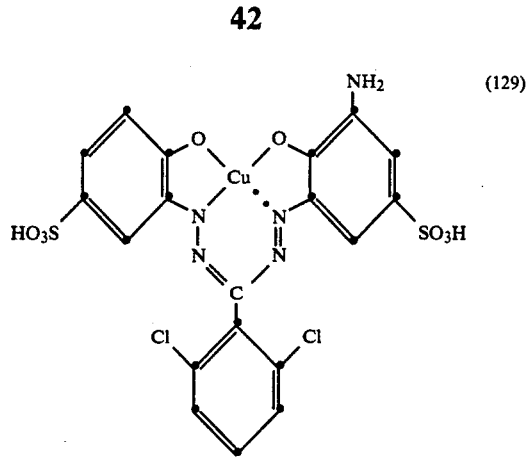
(129)

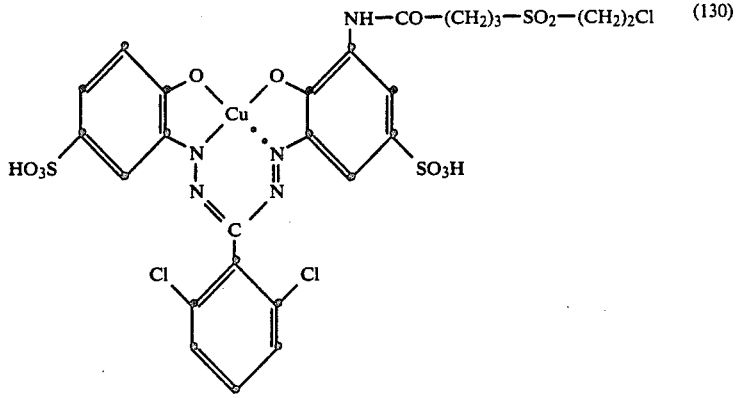

which dyes wool in reddish blue shades.

DYEING EXAMPLE 1

The following are dissolved in succession in 4000 parts of water at 50°: 4 parts of 80% acetic acid, 2 parts of the ammonium salt of the acid sulfuric ester of the adduct of a fatty amine (consisting of 30% of hexadecylamine, 25% of octadecylamine and 45% of octadecenylamine and 7 moles of ethylene oxide), and 4 parts of ammonium sulfate.

4 parts of the dye obtained as described in Example 7 are dissolved in 100 parts of hot water and added to the above dyebath. The dyebath is then entered with 100 parts of prewetted wool knitting yarn, and the temperature of the bath is raised from 50° to 80° in the course of 30 minutes. After 20 minutes' dyeing at 80°, the temperature is raised to the boil and dyeing is continued at the boil for 90 minutes. Almost all the dye goes onto the substrate. After cooling the bath down to 80°, the pH is raised from about 4.5 to a constant 8.5 by addition of ammonium solution, and the yarn is aftertreated at that temperature for 20 minutes. Thorough rinsing with hot and cold water, acidification with 1 part of 80% formic acid, centrifuging and drying gives a dark blue wool yarn of very good wet and rub fastness and excellent light fastness.

DYEING EXAMPLE 2

A wool fabric with an antifelting finish is impregnated with the preparation described hereinafter and squeezed off on a pad-mangle to a moisture pick-up of 250%:

| | |
|---|---|
| 4 parts of Diaprint REG ® (acid-resistant thickening agent), | |
| 1 part of sulfamic acid, | |
| 0.2 part of thymol, | |
| 0.2 part of emulsifier, | |
| 94.6 parts of water | |
| 100 parts | |

The impregnated material is then placed in a heatable press together with a transfer paper bearing a print pattern applied in a conventional manner with the dye of Example 3, and fabric paper are then pressed together at 100° to 105° under a pressure of about 0.5 kg/cm² for 3 minutes. After rinsing and drying, the wool fabric shows a corresponding blue print having very good fastness properties.

DYEING EXAMPLE 3

A chlorinated wool flannel fabric is impregnated on a pad-mangle with the dye preparation described hereinafter and squeezed off to a liquor pick-up of 100%:

| | |
|---|---|
| 50 parts of the dye of Example 8, | |
| 300 parts of urea, | |
| 320 parts of Solvitose OFA ® @ 4% (thickening agent), | |
| 10 parts of a mixture of anionic fatty alcohol ether sulfate with nonionic wetting agents, | |
| 10 parts of the levelling agent used in Dyeing Example 1, | |
| 10 parts of sodium metabisulfite, | |
| 10 parts of 80% acetic acid | |
| 290 parts of water | |
| 1000 parts of padding liquor. | |

The impregnated fabric is then rolled up and packed airtight and stored in that state at room temperature for 48 hours. After rinsing with cold water, the material is treated from a fresh bath with sufficient ammonia at 24% so as to give a pH of 8.5, and is maintained at 80° for 15 minutes. Rinsing in warm water is followed by the final step of souring off with 80% acetic acid and drying. The wool fabric has been dyed a deep blue shade having excellent fastness properties.

DYEING EXAMPLE 4

A chlorinated wool flannel fabric is impregnated on a pad-mangle with the dye preparation described hereinafter and squeezed off to a liquor pick-up of 100%:

| | |
|---|---|
| 50 parts of the dye of Example 7, | |
| 300 parts of Solvitose OFA ® @ 40% (thickening agent) | |
| 20 parts of a mixture of anionic fatty alcohol ether sulfate with nonionic wetting agents, | |
| 10 parts of the levelling agent used in Dyeing Example 1, | |
| 20 parts of 80% acetic acid, | |
| 600 parts of water | |
| 1000 parts of padding liquor. | |

The impregnated fabric is then introduced into a steamer and treated with saturated steam for 20 to 40 minutes. After rinsing with cold water, the material is treated from a fresh bath with sufficient 24% ammonia solution so as to give a pH of 8.5, and is maintained at 80° for 15 minutes. Rinsing in warm water is followed by the final step of souring off with 80% acetic acid and drying. The wool fabric has been dyed a deep blue shade having excellent fastness properties.

DYEING EXAMPLE 5

The following are dissolved in succession in 1000 parts of water at 50°: 4 parts of 80% acetic acid, 2 parts of the ammonium salt of the acid sulfuric ester of the adduct of a fatty amine (consisting of 30% of hexadecylamine, 25% of octadecylamine and 45% of octadecenylamine and 7 moles of ethylene oxide), and 4 parts of ammonium sulfate.

3 parts of the dye obtained as described in Example 8 are dissolved in 100 parts of hot water and added to the above dyebath. A circulation dyeing machine is charged with 100 parts of prewetted tops in package form, and the temperature of the bath is raised from 50° to 97°–99° in the course of 30 minutes and the bath is then left at the boil for 90 minutes. Almost all the dye goes on to the substrate. After cooling down the bath to 80°, the pH is raised from about 4.5 to a constant 8.5 by addition of ammonia solution, and the goods are aftertreated at that temperature. Thorough rinsing with hot and cold water, souring off with 1 part of 80% formic acid, centrifuging and drying leaves a dark blue yarn of very good wet fastness and excellent light fastness.

DYEING EXAMPLE 6

The following are dissolved in succession in 1000 parts of water at 50°: 6 parts of 80% acetic acid, 3 parts of the ammonium salt of the acid sulfuric ester of the adduct of a fatty amine (consisting of 30% of hexadecylamine, 25% of octadecylamine and 45% of octadecenylamine and 7 moles of ethylene oxide), and 6 parts of ammonium sulfate.

3 parts of the dye obtained as described in Example 2 are dissolved in 100 parts of hot water and added to the above dyebath. A circulation dyeing machine is charged with 150 parts of prewetted loose wool, and the temperature of liquor is raised from 50° to 97°–99° in the course of 30 minutes, and dyeing is then carried out at the boil for 90 minutes. Almost all the dye goes on to the substrate. After cooling down the liquor to 80°, the pH is raised from about 4.5 to a constant 8.5 by addition of ammonia solution, and the wool is aftertreated at that temperature for 20 minutes. Thorough rinsing with hot and cold water, souring off with 1 part of 80% formic acid, centrifuging and drying leaves a blue substrate which is level in the fibre and has good wet and rub fastness and excellent light fastness.

DYEING EXAMPLE 7

The following are dissolved in succession in 4000 parts of water at 50°: 4 parts of 80% acetic acid, 2 parts of the ammonium salt of the acid sulfuric ester of the adduct of a fatty amine (consisting of 30% hexadecylamine, 25% of octadecylamine and 45% of octadecenylamine and 7 moles of ethylene oxide) and 4 parts of ammonium sulfate. 0.45 part of the dye obtained as described in Example 7, 0.30 part of the yellow dye of the formula

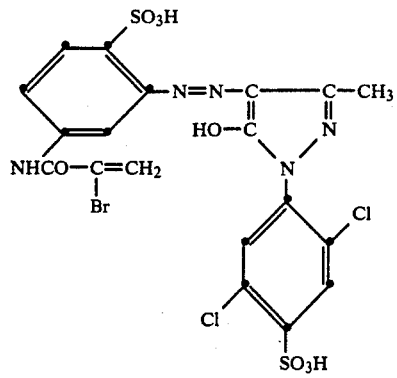

and 0.40 part of the red dye of the formula

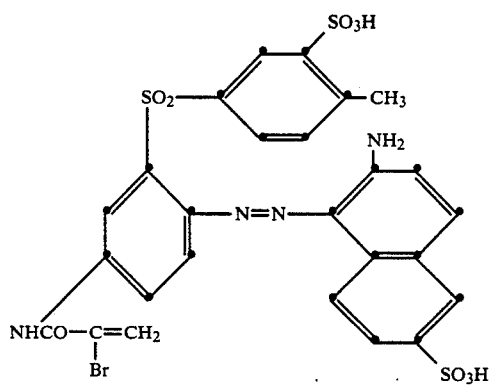

are dissolved in 100 parts of hot water and are added to the above dyebath. 100 parts of prewetted wool fabric are then introduced, and the temperature of the bath is raised from 50° to 80° in the course of 30 minutes. After 20 minutes' at 80°, the bath is heated to the boil and dyeing is then continued at the boil for 90 minutes. Almost all the dye goes onto the substrate. After cooling the bath down to 80°, the pH is raised from about 4.5 to a constant 8.5 by addition of ammonia solution, and the fabric is aftertreated at that temperature for 20 minutes. Thorough rinsing with hot and cold water, souring off with 1 part of 80% formic acid, centrifuging and drying leaves a dark brown wool fabric which is level in the fibre and has very good wet and rub fastness and excellent light fastness.

DYEING EXAMPLE 8

The following are dissolved in succession in 1000 parts of water at 50°: 4 parts of 80% acetic acid, 2 parts of the ammonium salt of the acid sulfuric ester of the adduct of a fatty amine (consisting of 30% of hexadecylamine, 25% of octadecylamine and 45% of octadecenylamine and 7 moles of ethylene oxide), and 4 parts of ammonium sulfate.

0.6 part of the dye obtained in Example 3, 0.09 part of the yellow dye of the formula

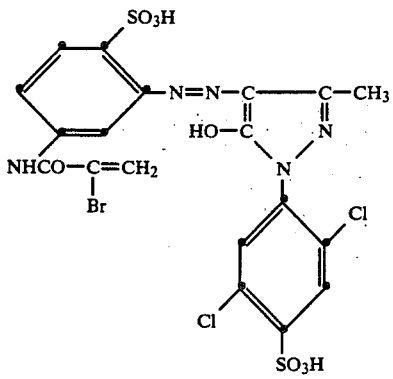

and 0.2 part of the red dye of the formula

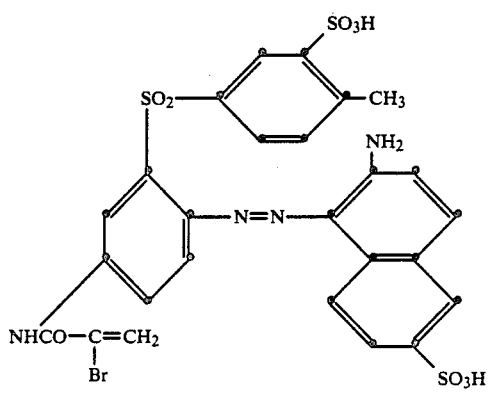

are dissolved in 100 parts of hot water and added to the above dyebath. A circulation dyeing machine is charged with 100 parts of prewetted tops in package form, and the temperature of the bath is raised from 50° to 97°-99° in the course of 30 minutes, and dyeing is then continued at the boil for 90 minutes. Almost all the dye goes onto the substrate. After cooling the bath down to 80°, the pH is raised from about 4.5 to a constant 8.5 by addition of ammonia solution, and the packages are aftertreated at that temperature for 20 minutes. Thorough rinsing with hot and cold water, souring off with 1 part of 80% formic acid, centrifuging and drying leaves a grey material of very good wet fastness and excellent light fastness.

What is claimed is:

1. A fibre-reactive formazan dye of the formula

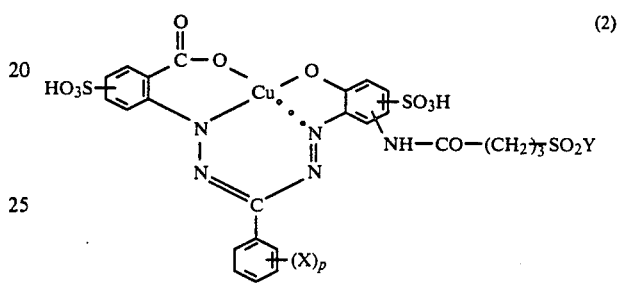 (2)

where X is chlorine, Y is $\beta$-halo-ethyl or vinyl and p is 0, 1 or 2.

2. A fibre-reactive formazan dye according to claim 1 of the formula

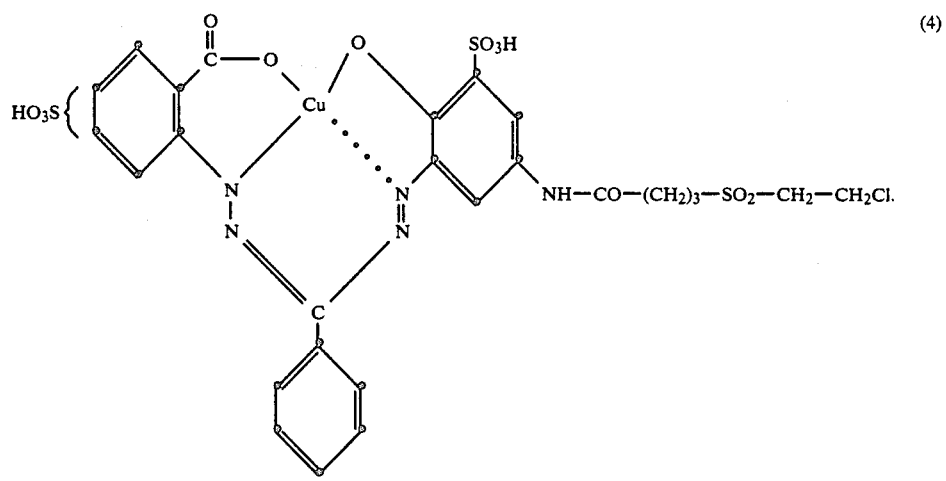 (4)

3. A fibre-reactive formazan dye according to claim 1 of the formula

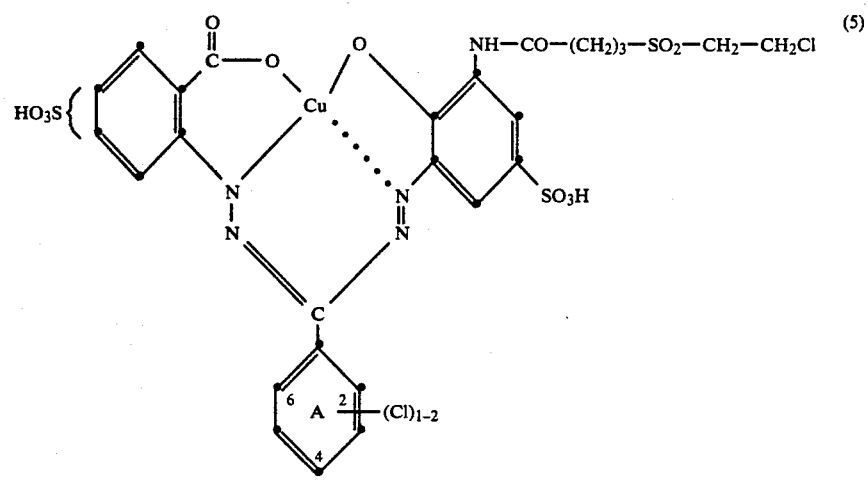
(5)
where chlorine is bonded to the phenyl ring A in the 2-, 3- or 4-position, or where chlorine is bonded to the phenyl ring A in the 2- and 6-positions.
4. A fibre-reactive formazan dye according to claim 1 of the formula
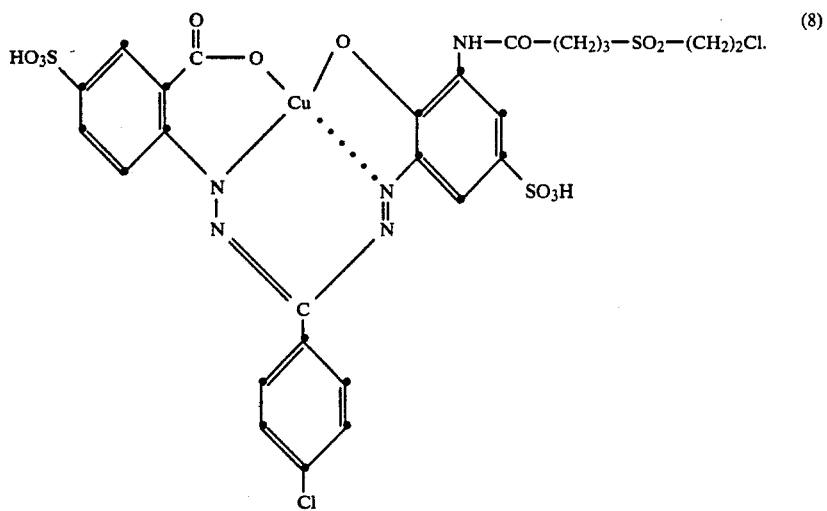
(8)
5. A fibre-reactive formazan dye according to claim 1 of the formula
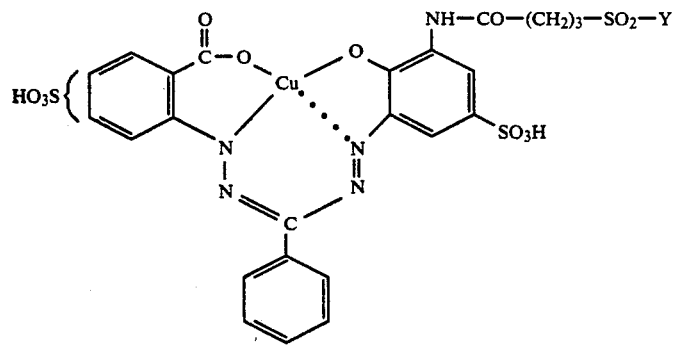
where Y is β-chloroethyl or vinyl.
6. A fibre-reactive formazan dye of the formula (7)
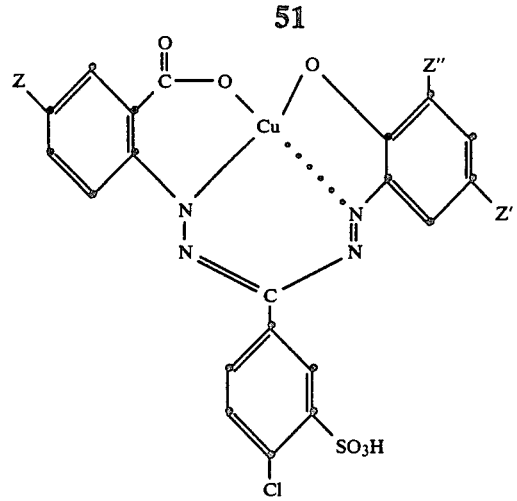
where Z is hydrogen, Z' is sulfo and Z" is —NH—CO—(CH$_2$)$_3$—SO$_2$—(CH$_2$)$_2$Cl, or where Z is sulfo, Z' is —NH—CO—(CH$_2$)$_3$—SO$_2$—(CH$_2$)$_2$Cl and Z" is hydrogen.
* * * * *